(12) United States Patent
Kim et al.

(10) Patent No.: US 7,476,984 B2
(45) Date of Patent: Jan. 13, 2009

(54) SPRING ACTIVATED ENERGY TRANSDUCER GENERATING A/C ELECTRICITY FROM RECIPROCATING NATURAL FORCES

(76) Inventors: Hyun Bong Kim, 8438 Geyser Ave., Northridge, CA (US) 91324; Yong Ja Kim, 8438 Geyser Ave., Northridge, CA (US) 91324; Michelle Lee, 8438 Geyser Ave., Northridge, CA (US) 91324; Sung Ki Kim, 8438 Geyser Ave., Northridge, CA (US) 91324; Jung Ki Kim, 8438 Geyser Ave., Northridge, CA (US) 91324

( * ) Notice: Subject to any disclaimer, the term of this patent is extended or adjusted under 35 U.S.C. 154(b) by 24 days.

(21) Appl. No.: 11/441,288

(22) Filed: May 26, 2006

(65) Prior Publication Data

US 2007/0273157 A1    Nov. 29, 2007

(51) Int. Cl.
*F03B 13/10* (2006.01)
(52) U.S. Cl. ...................................... 290/1 E
(58) Field of Classification Search ................... 290/1 E, 290/1 R; 310/37
See application file for complete search history.

(56) References Cited

U.S. PATENT DOCUMENTS

| | | | | | |
|---|---|---|---|---|---|
| 1,379,413 | A | * | 5/1921 | New .......................... | 310/75 B |
| 2,918,538 | A | * | 12/1959 | Schumann ................... | 369/140 |
| 3,173,075 | A | * | 3/1965 | Guiot .......................... | 322/40 |
| 4,524,283 | A | * | 6/1985 | Latvus ........................ | 290/1 E |
| 5,880,532 | A | * | 3/1999 | Stopher ....................... | 290/1 E |
| 5,909,784 | A | | 6/1999 | Best ............................ | 185/10 |
| 6,744,145 | B2 | | 6/2004 | Chang ......................... | 290/1 R |
| 6,825,574 | B1 | | 11/2004 | Mooring ..................... | 290/1 R |
| 7,009,315 | B2 | * | 3/2006 | Takeuchi ..................... | 310/15 |
| 7,148,583 | B1 | * | 12/2006 | Shau et al. .................. | 290/1 R |
| 7,304,398 | B1 | * | 12/2007 | Kim et al. ................... | 290/1 E |
| 2005/0035600 | A1 | * | 2/2005 | Albsmeier et al. .......... | 290/1 E |
| 2006/0028026 | A1 | * | 2/2006 | Yim ............................ | 290/53 |

FOREIGN PATENT DOCUMENTS

| JP | 58176531 | A | | 10/1983 |
|---|---|---|---|---|
| JP | 58176531 | A | * | 10/1983 |

* cited by examiner

*Primary Examiner*—Joseph Waks

(57) ABSTRACT

The energy transducer includes an upper part and a lower part. The upper part having a housing, a helix metal spring, a first circular board, a second circular board with a short metal shaft, a ball bearing engaged to the short metal shaft, a third circular board with a groove to receive metal bearing balls, an upper metal shaft welded to the bottom of the third circular board, four arc-shaped springs welded to the bottom of the third circular board, and four sets of wheels rotatably attached to one end of the spring. The lower part includes: a housing, a lower metal shaft, a fourth circular board placed on the upper end of the lower part, bundles of electric wire, pluralities of permanent magnets, and a fifth circular board placed at the lower end of the lower part. As the helix metal spring is compressed by an external force, the bundle of electric wire turns between permanent magnets to produce electricity. Direction of the electricity alternates as the helix metal spring oscillates.

3 Claims, 7 Drawing Sheets

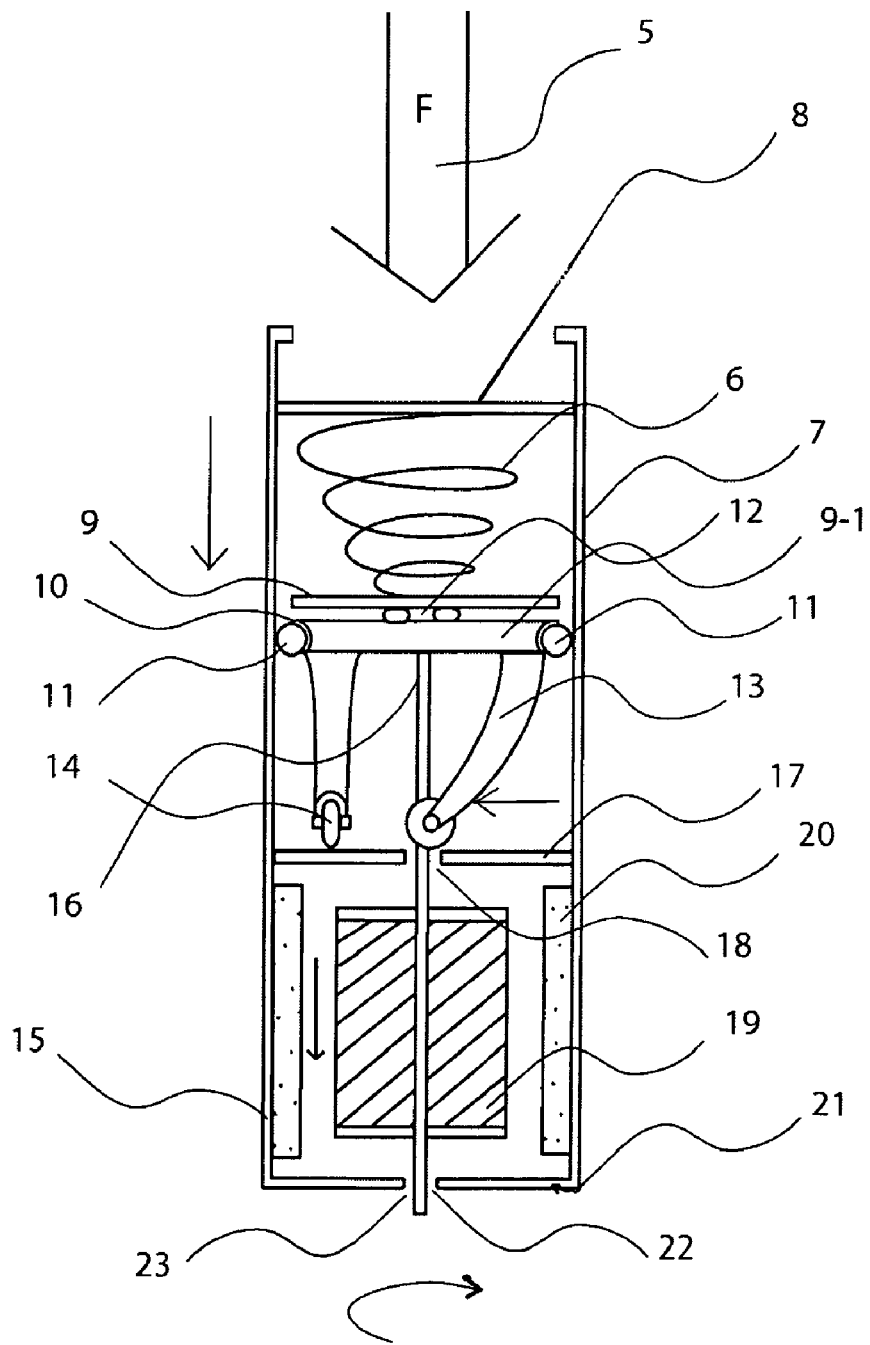
Fig. 3-a

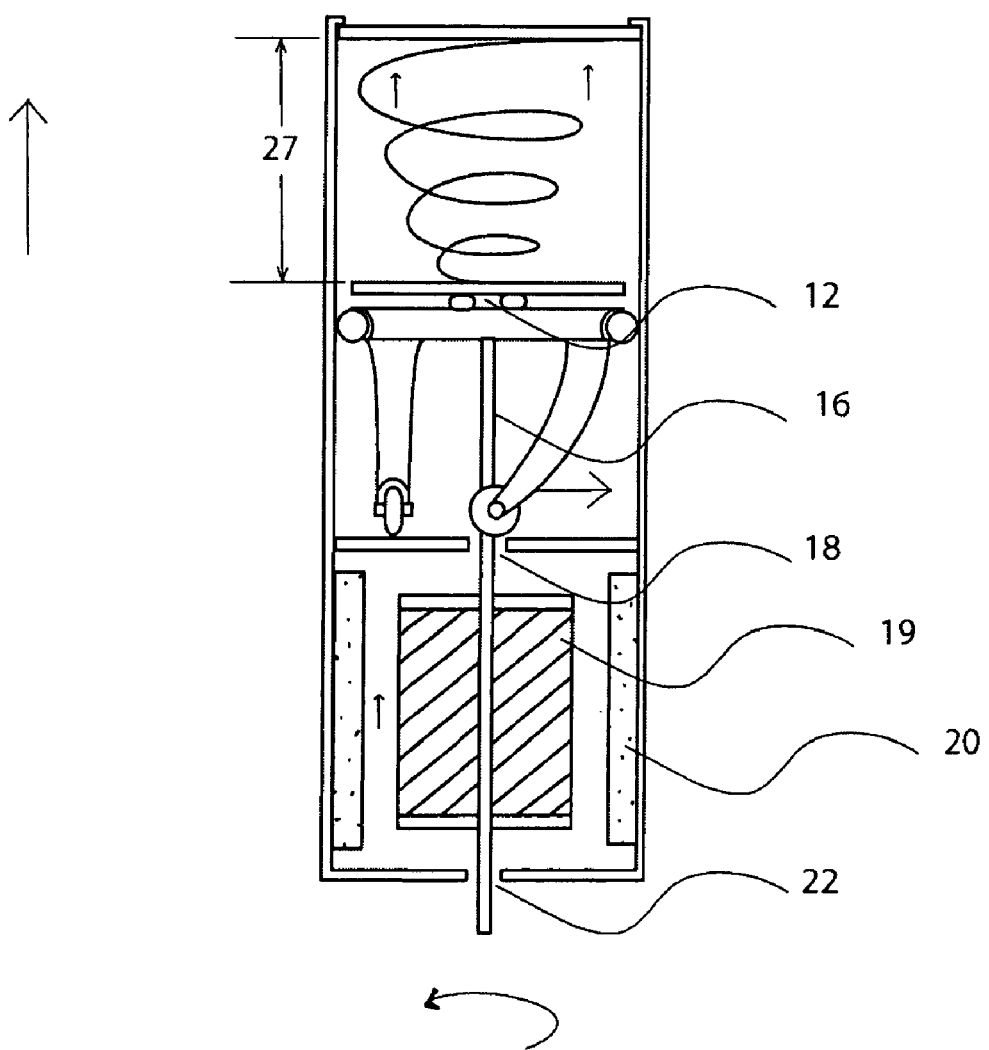
Fig. 3-b

SPRING ACTIVATED ENERGY TRANSDUCER GENERATING A/C ELECTRICITY FROM RECIPROCATING NATURAL FORCES

FIELD OF THE INVENTION

The invention relates to a spring activated energy transducer, more specifically related to an A/C generator powered by external natural forces.

1. Background of the Invention

Two major types of electricity power plants are hydraulic power plants and fossil fuel power plants. Nuclear power plants are a kind of fossil fuel power plant. However, all the power plants are huge structures intended for the mass production of electricity. For small scale electricity power generation, such as for small passenger cars, internal combustion engines are the most popular electricity power generator these days. As the oil prices increase every year, attempts have been made to utilize alternative natural energy sources, such as solar energy and wind power, to produce electricity from their unlimited source of natural power. Still, most of these systems are expensive compared to the cost of electricity produced by fossil fuels. There exist other natural forces which have not been considered for generating electricity that needs to be investigated. One of these is the force of wind that causes a tree to bend repeatedly as the wind periodically blows. Another large, untapped natural source of power is the waves of a large body of water. It is the object of the invention to provide a novel electricity generation system that is economical to manufacture and market.

2. Description of the Prior Art

U.S. Pat. No. 6,825,574 to Mooring illustrates an electricity generation system that has the ability to generate electrical-power by mechanically capturing power of large trees as they sway in the wind. The system utilizes a modular unit that is mounted on a frame assembly covered by a housing. A plurality of spring motors are mounted in a spring motor housing that is journaled on an elongated spring-motor secondary winding axle. That system is too large for conventional family cars.

U.S. Pat. No. 6,744,145 to Chang illustrates a footwear includes an outsole defining a reference plane, a stand projecting from the outsole and having an inclined upper surface that is inclined relative to the reference plane, a power generator mounted on the outsole and including a rotor, and a driving unit including a weight that has a pivot end mounted pivotally on the inclined upper surface, and a free end opposite to the pivot end. The weight is connected to the rotor, and is swingable by virtue of gravity as a result of swinging of the inclined upper surface of the stand so as to drive the rotor. Electricity generated from that footwear is too small for moving any vehicles.

U.S. Pat. No. 5,909,784 to Best illustrates a spring motor providing an efficient storage of mechanical energy, translating the potential energy of wound springs to mechanical rotation. The invention includes a frame supporting two gears having peripheral teeth. A first coil spring is positioned about a first shaft and is attached to the first gear and the frame. Similarly, a second coil spring is positioned about a second shaft and is attached to the second gear and the frame. The peripheral teeth of the two gears engage with each other so that rotation of the first gear causes rotation of the second gear. The first and second coil springs are opposingly wound so that potential energy stored in the first coil spring is mechanically transferred, in an oscillating manner, to the second coil spring through rotation of the gears. A chain is attached to the peripheral teeth of the gears so that the chain is linearly displaced as the gears oscillate. Means is provided for transforming the linear displacement of the chain to rotational displacement of the first or second gear.

U.S. Pat. No. 5,880,532 to Stopher illustrates a spring motor utilizing a series arrangement of alternately-wound coiled springs coupled to one another at common ends. The spring motor is coupled to a generator through a gear mechanism to provide a portable and reusable supply of electric power. In addition, the spring motor may be used in a vehicle to recapture wasted energy due to lost momentum during braking. The spring motor is coupled to a winding mechanism for driving the spring motor in response to application of the vehicle's brakes.

SUMMARY OF THE INVENTION

As the oil price increases every year, attempts have been made to utilize alternative natural energy sources, such as solar energy and wind power, to produce electricity from their unlimited source of natural power. There exist natural forces other than fossil combustion, which have not been utilized for generating electricity. It is object of the invention to provide an electricity generation system that is economical to manufacture and market. A spring activated energy transducer is provided. The energy transducer of the current invention generates alternating current (A/C) electricity from abundant external natural forces. The energy transducer is comprised of an upper part and a lower part. The upper part is comprised of a housing, a helix metal spring, a first circular board, a second circular board with a short metal shaft, a ball bearing engaged to the short metal shaft, a third circular board with a groove to receive metal bearing balls, an upper metal shaft welded to the bottom of the third circular board, four arc-shaped springs welded to the bottom of the third circular board, and four sets of wheels rotatably attached to one end of the spring. The lower part is comprised of a housing, a lower metal shaft, a third circular board placed on the upper end of the lower part, bundles of electric wire, pluralities of permanent magnets, and a fourth circular board placed at the lower end of the lower part. As the helix metal spring is compressed by an external force, the bundle of electric wire turns between permanent magnets to produce electricity. Direction of the electricity alternates as the helix metal spring oscillates.

BRIEF DESCRIPTION OF THE DRAWINGS

FIG. 3-a is a vertical cross-sectional view of the energy transducer of the current invention along the line A-A' in FIG. 2 and showing the movement of parts when an external force is applied to the main spring.

FIG. 3-b is a vertical cross-sectional view of the energy transducer of the current invention along the line A-A' in FIG. 2 and showing the movement of parts when an external force is removed from the main spring.

FIG. 4 is a schematic upside-down drawing of the second circular plate and arc shape springs welded there to.

DETAILED DESCRIPTION OF THE PREFERRED EMBODIMENT

Figure 1:
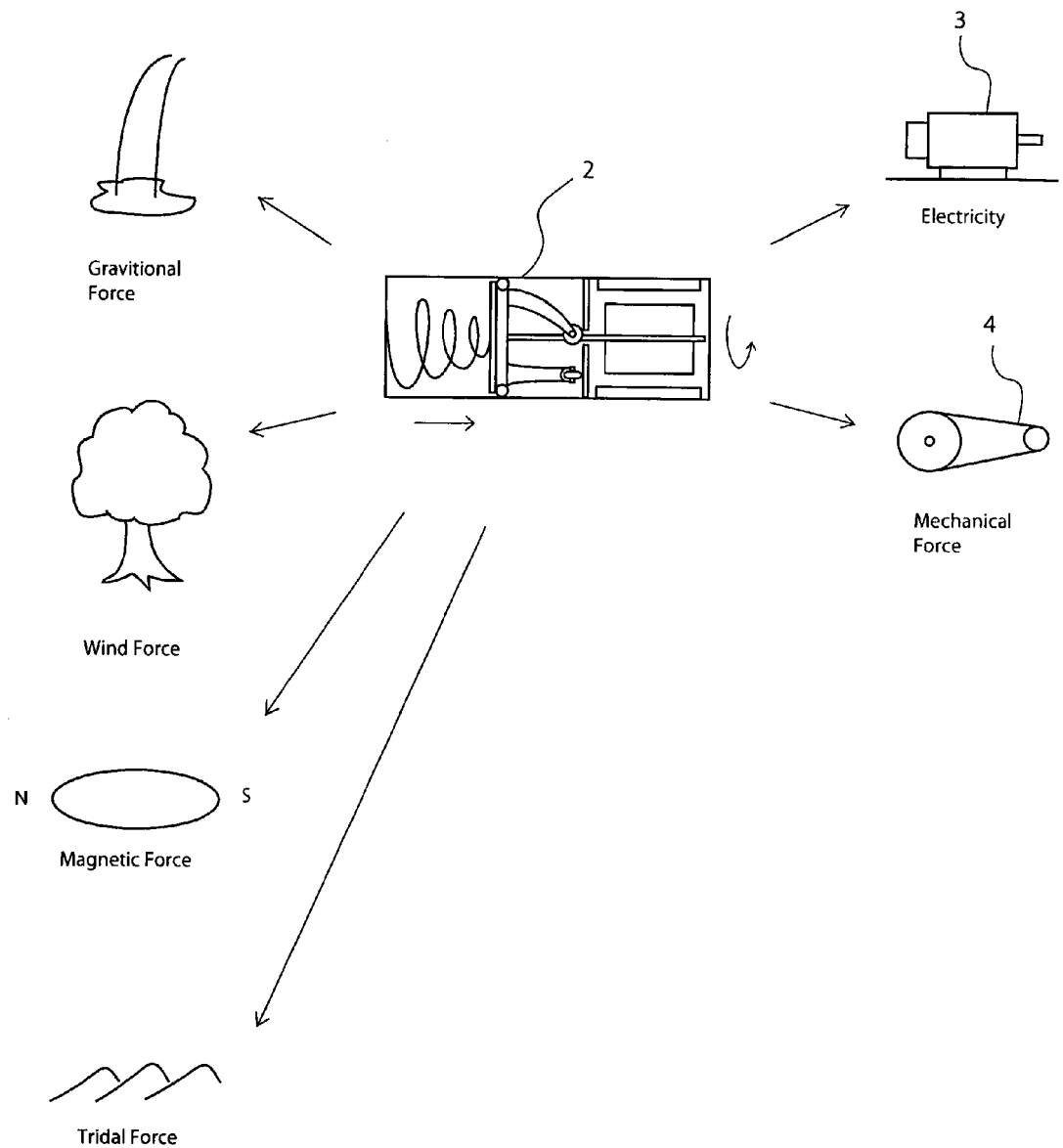
FIG. 1 is a schematic diagram showing how many kind of natural forces can generate electricity with an energy transducer of the current invention.

FIG. 1 is a schematic diagram showing how various kind of natural forces (1) generate electricity via an energy transducer (2) of the current invention. Gravitational forces, wind forces, magnetic forces, and mechanical forces such as tidal forces and animal forces can be transformed into electricity (3) and another mechanical force (4) via the energy transducer (2) of the current invention.

Figure 2:
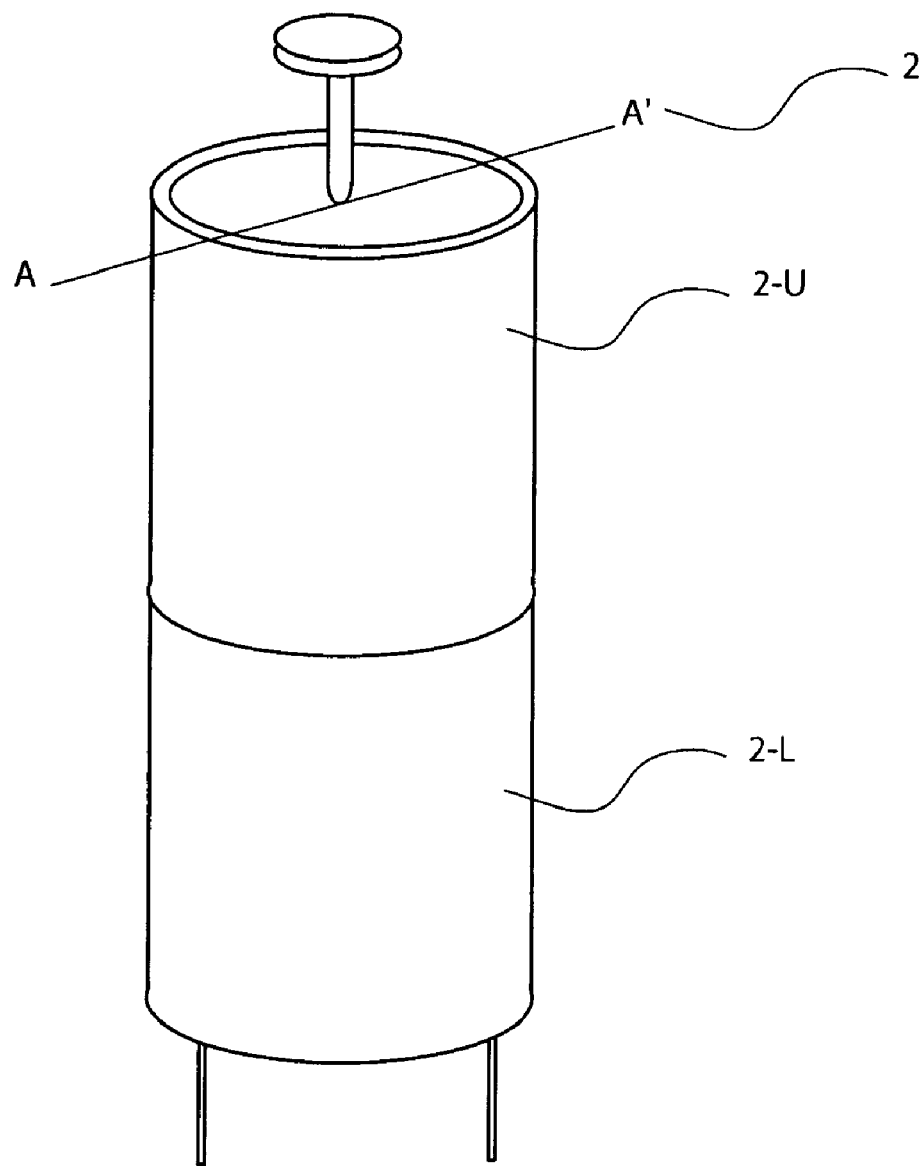
FIG. 2 is a perspective view of energy transducer of the current invention.

FIG. 2 is a perspective view of energy transducer (2) of the current invention. The energy transducer (2) is mainly comprised of an upper part (2-U) and a lower part (2-L). FIG. 3-a is a vertical cross-sectional view of the energy transducer (2) of the current invention along the line A-A' in FIG. 2 and showing the movement of parts when an external force (5) is applied to the main metal spring (6).

The upper part (2-U) is comprised of a housing (7), a main metal spring (6) of helix shape, a first circular board (8) placed on the main metal spring (6), a second circular board (9) with a short metal shaft (9-2), a ball bearing (12) engaged to the short metal shaft (9-2), a third circular board (9-1) with a groove (10) to receive metal bearing balls (11), an upper metal shaft (16-U) welded to the bottom of the third circular board (9-1), four arc-shaped springs (13) welded to the bottom of the third circular board (9-1) along the outer brim thereof, and four sets of wheels (14) rotatably attached to one end of the spring (13) that is opposite of the welded end. The lower part (2-L) is comprised of a housing (15), a metal shaft (16), a fourth circular board (17) which has a hole (18) for shaft (16) at the center and placed on the upper end of the lower part (2-L), bundles of electric wire (19) fixed to the metal shaft (16), pluralities of permanent magnets (20) attached to the inner wall of the lower part (2-L), and a fifth circular board (21) which has another hole (22) for the shaft (16) at the center and placed at the lower end of the lower part (2-L).

When an external force (5) is applied to the energy transducer (2) of the current invention, the main metal spring (6) is compressed and compresses the second circular plate (9). Then the second circular plate (9) presses the third circular plate (9-1) and as a result the arc-shaped springs (13) are distorted due to the force (5). At the same time, the third circular plate (9-1) turns clockwise due to the wheels (14) rotatably attached to one end of the arc shape spring (13) that is opposite side of the welded end and the metal bearing balls (11) engaged in the groove (10).

Then, the metal shaft (16) rotates the bundle (19) of electric wire clockwise. As the result of bundle (19) of electric wire rotating in the middle of the permanent magnet (20), electricity is generated.

Generated electricity is transferred to other electric instruments, such as an electric motor (3) shown in FIG. 1 through electricity wire with properly designed connector.

FIG. 3-b is a vertical cross-sectional view of the energy transducer (2) of the current invention along the line A-A' in FIG. 2 and showing the movement of parts when an external force (5) is removed from the main spring. When the external force (5) is removed from the transducer (2), the main metal spring (6) expanded to its original shape and the four arc-shaped springs (13) also return to its original shape and position. This returning force rotates the metal shaft (16) counter-clockwise as the bundle (19) of electric wire rotates counter-clockwise. Then, the electricity also generated. However, the direction of the electric current is reversed.

Figure 4:
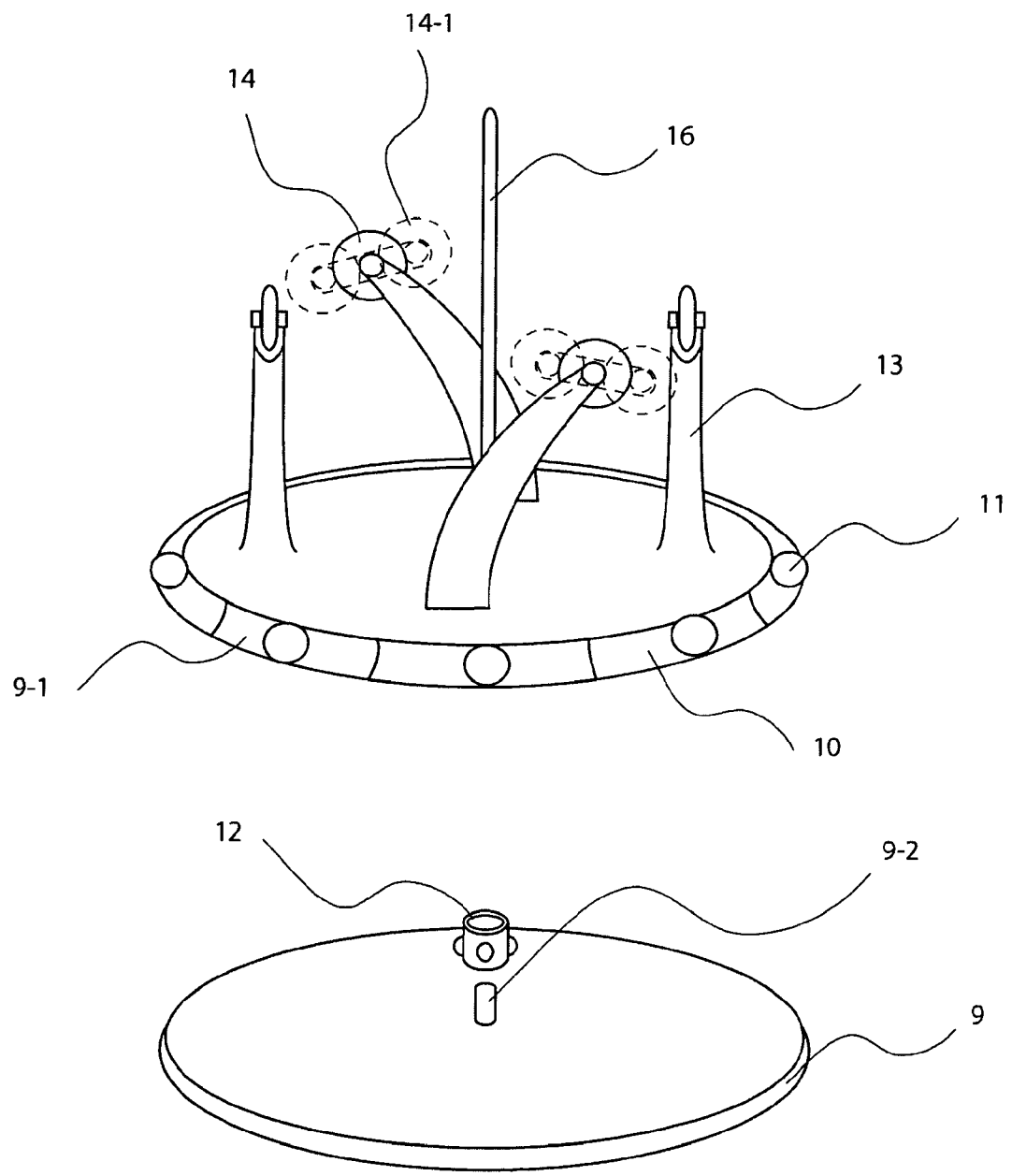

FIG 4 is a schematic upside-down drawing of the second circular plate (9) and arc shape springs (13) welded to the third plate (9-1).

FIG. 4 shows in more detail about the short metal shaft (9-2) welded to the bottom of the second circular board (9) and the ball bearing (12) engaged to the short metal shaft (9-2). In FIG. 3-a and FIG. 3-b, the wheels (14) attached at the bottom of the arc shaped springs are single wheel. But, single wheel is a little bit unstable compared to two wheels in one set.

Another embodiment is that four sets (14-1) of wheels, two wheels in each set, can be applied instead of single wheels. Each set is comprised of two wheels of different size.

Figure 5:
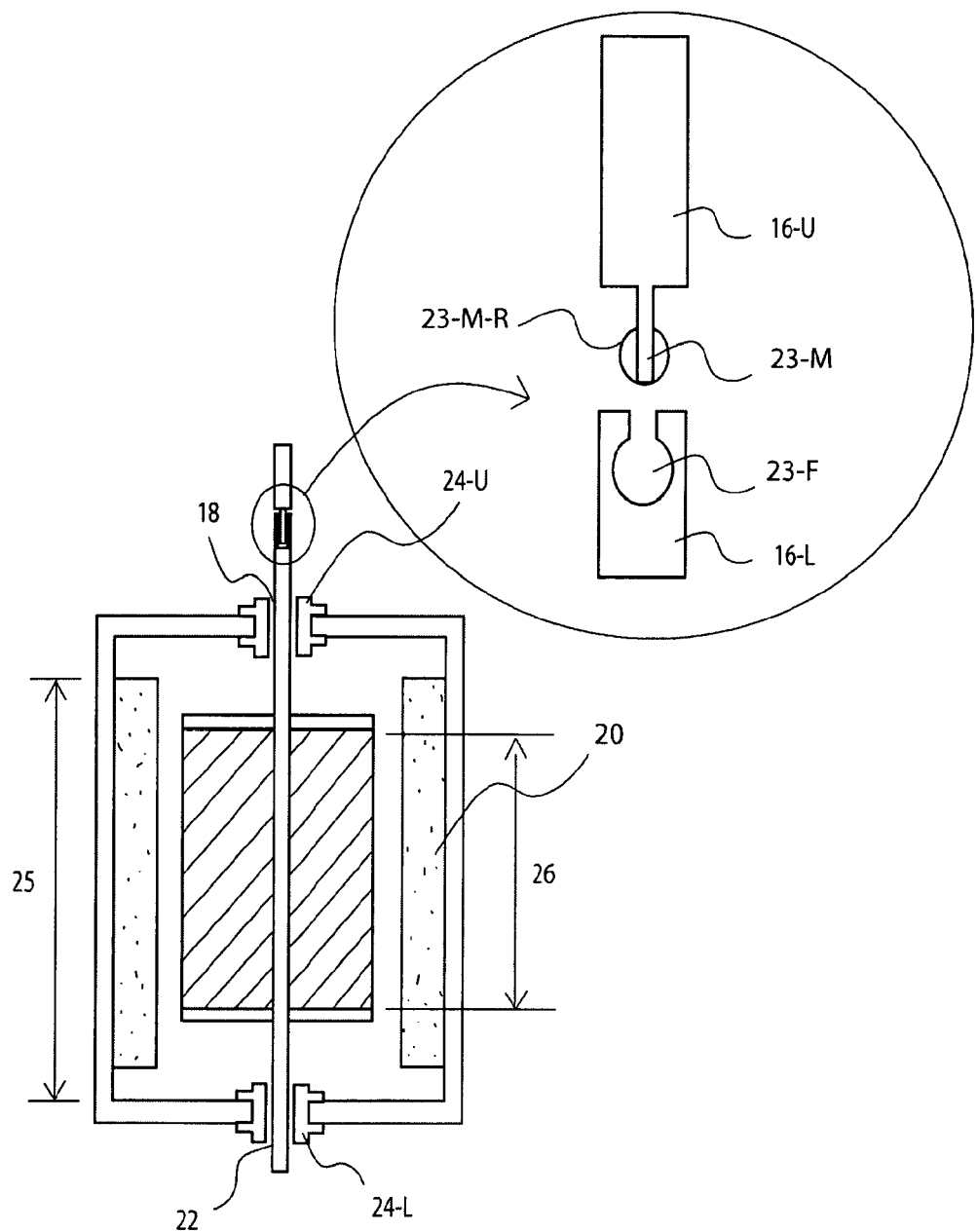
FIG. 5 is a detailed cross-sectional view of the lower part of the energy transducer of the current invention.

FIG. 5 is a detailed cross-sectional view of the lower part (2-L) of the energy transducer (2) of the current invention to show connection of the shaft (16) and other parts. The metal shaft (16) is divided into two parts of upper metal shaft (16-U) and lower metal shaft (16-L). The two parts are engaged into one via a male connector (23-M) and female connector (23-F). The male connector (23-M) is a ribbon spring protruded outward.

Two plastic sleeves (24-U) and (24-L) are placed in the hole (18) developed on the upper barrier (17) of the lower part and other hole (22) developed on the lower barrier (21), respectively. The sleeves (24-U) and (24-L) are made of Teflon® to make the metal shaft rotates smoothly.

The lower end of the lower metal shaft (16-L) pass through the hole (22) developed on the lower barrier (21) to allow the whole metal shaft (16) goes downward when external force (5) is applied to the energy transducer (2).

The height (25) of the permanent magnet (20) is the sum of the height (26) of the bundle (19) of electric wire plus the height (27) of the main spring (6).

When no external force is applied to the energy transducer (2), the upper end of the bundle (19) of electric wire reaches the upper end of the permanent magnet (20). When the main spring (6) is fully compressed, the lower end of the bundle (19) reaches the lower end of the permanent magnet (20). As a result, the bundle (19) of electric wire rotates alternately as the main spring oscillates by the external force to generate alternating current electricity.

Figure 6:
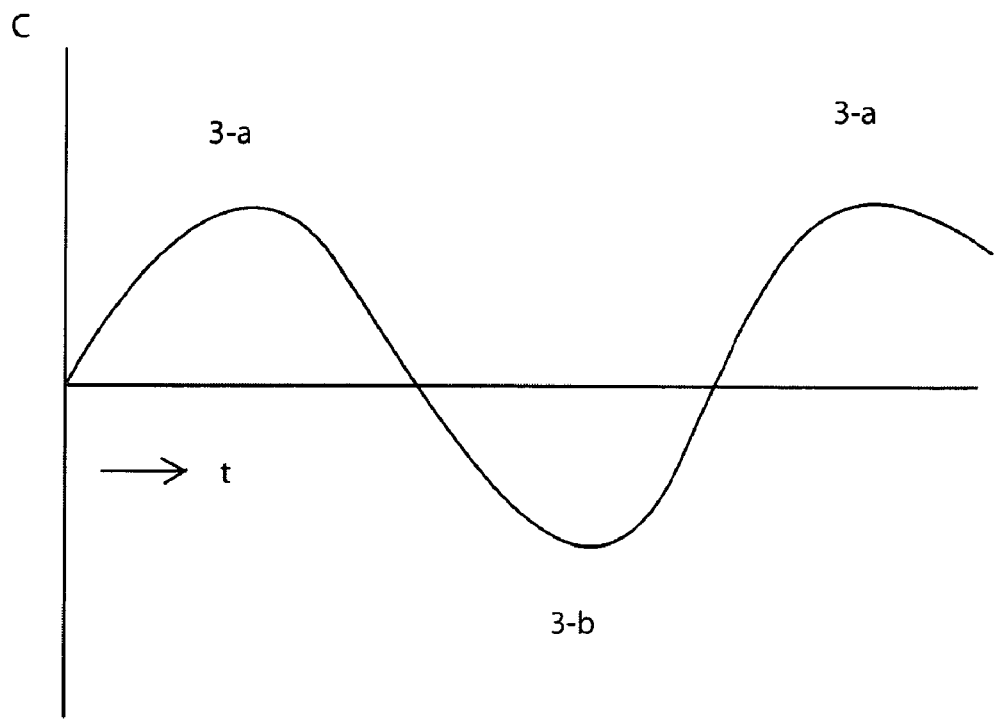
FIG. 6 is a schematic diagram of direction of electricity along the motion of the energy transducer.

FIG. 6 is a schematic diagram of direction of electricity along the motion of the energy transducer (2). When an external force (5) starts to apply to the generator (2) of the current invention and the bundle (19) of electric wire turns as shown in FIG. 3-a, electricity starts to generated in one direction. The direction of the current maintains until the main spring (6) reaches maximum retracted position due to the immediate external force (5). When the external force (5) is removed and the main spring (6) starts to return to the extended position, the metal shaft (16) turns the bundle (19) of the electric wire to the opposite direction. Then the direction of the electricity changed opposite. Repeated oscillation of the helix spring (6) generates an alternating current (A/C).

The energy transducer of the current application can be applied to many systems that need A/C electricity. Alternating the rotation of the metal shaft can be directly connected to the other mechanical tools.

What is claimed is:
1. A spring activated energy transducer generating A/C from natural force is comprised of:
    an upper part that is comprised of;
        a housing, and
        a main metal spring of helix shape, and
        a first circular board placed on the main metal spring, and
        a second circular board that is placed under the main metal spring with a short metal shaft, and
        a ball bearing engaged to the short metal shaft, and a third circular board with a groove to receive metal bearing balls, and a metal shaft welded vertically to the bottom of the third circular board at the center thereof, and four arc-shaped springs welded to the bottom of the third circular board along the outer brim thereof, and four wheels, each of which is rotatably attached to one end of the arc-shaped spring that is opposite of the welded end, and a lower part that is comprised of;

a housing, and a metal shaft, and an upper barrier which has a hole for shaft at the center and placed on the upper end of the lower part, and bundles of electric wire fixed to the metal shaft, and pluralities of permanent magnets attached to the inner wall of the lower part, and a lower barrier which has another hole for the shaft at the center and placed at the lower end of the lower part.

2. A spring activated energy transducer generating A/C from natural force of claim 1, wherein bundle of electric wire rotates alternately as the main spring oscillates by the external force to generate alternating current electricity.

3. A spring activated energy transducer generating A/C from natural force of claim 1, wherein one set of wheels, each of which is comprised of two wheels of different size, is attached to each of the four arc-shaped springs.

* * * * *